United States Patent [19]

Junier

[11] Patent Number: 4,813,817
[45] Date of Patent: Mar. 21, 1989

[54] PLUG VALVE

[75] Inventor: Marius R. Junier, Houston, Tex.

[73] Assignee: Triten Corporation, Houston, Tex.

[21] Appl. No.: 25,328

[22] Filed: Mar. 13, 1987

[51] Int. Cl.⁴ .................... B65G 53/14; B65G 53/42
[52] U.S. Cl. ......................... 406/116; 137/533.31; 137/606; 417/183
[58] Field of Search ........... 137/891, 893, 895, 533.21, 137/533.17, 533.31, 606; 406/116, 142, 143; 417/183, 188

[56] References Cited

U.S. PATENT DOCUMENTS

| | | | |
|---|---|---|---|
| 136,780 | 3/1973 | Smith | 417/183 |
| 582,282 | 5/1897 | Greiner | 137/533.21 X |
| 758,118 | 4/1904 | Sticker . | |
| 998,111 | 7/1911 | Murray . | |
| 1,319,193 | 10/1919 | Von Porat . | |
| 1,364,532 | 1/1921 | Von Porat . | |
| 1,566,517 | 12/1925 | Bergman . | |
| 2,433,726 | 12/1947 | Angell . | |
| 2,608,801 | 9/1952 | Ridley | 137/891 X |
| 2,664,338 | 12/1953 | Cornell . | |
| 2,668,755 | 2/1954 | Kershaw et al. . | |
| 2,794,447 | 6/1957 | Spitz | 137/891 X |
| 2,850,364 | 9/1958 | Dowling . | |
| 2,901,331 | 8/1959 | Held et al. . | |
| 3,315,700 | 4/1967 | Greenwood . | |
| 3,339,577 | 9/1967 | Teegarden . | |
| 3,658,091 | 3/1970 | Buzzi | 137/895 X |
| 3,846,080 | 11/1974 | MacLean et al. . | |
| 4,016,900 | 4/1977 | Shipp et al. | 137/533.31 X |
| 4,436,113 | 3/1984 | Finger | 137/895 X |
| 4,518,146 | 5/1985 | Stinson et al. . | |
| 4,623,119 | 11/1986 | van der Wiel . | |

Primary Examiner—Stephen Hepperle
Attorney, Agent, or Firm—Vaden, Eickenroht, Thompson & Boulware

[57] ABSTRACT

A plug valve, a check valve for a plug valve, a pressure regulator for a plug valve, and a check valve for a conduit. A plug valve having a plug closure member for sealing off the open end of a conduit and thereby preventing flow of a first fluid through the conduit, the plug closure member connected to a hollow stem, a channel for the flow of a second fluid extending through the hollow stem and plug closure member, the plug closure member and stem movable in a guide tube toward and away from the open end of the conduit, the plug closure member seatable in the open end of the conduit. In one embodiment the plug valve may have a pressure regulating member in the channel through which the second fluid flows. In another embodiment a check valve may be disposed within the channel to prevent flow of the first fluid down the hollow stem. The pressure regulating member and check valve may be combined in one embodiment. A conduit for use with a plug valve, the conduit having a check valve.

5 Claims, 4 Drawing Sheets

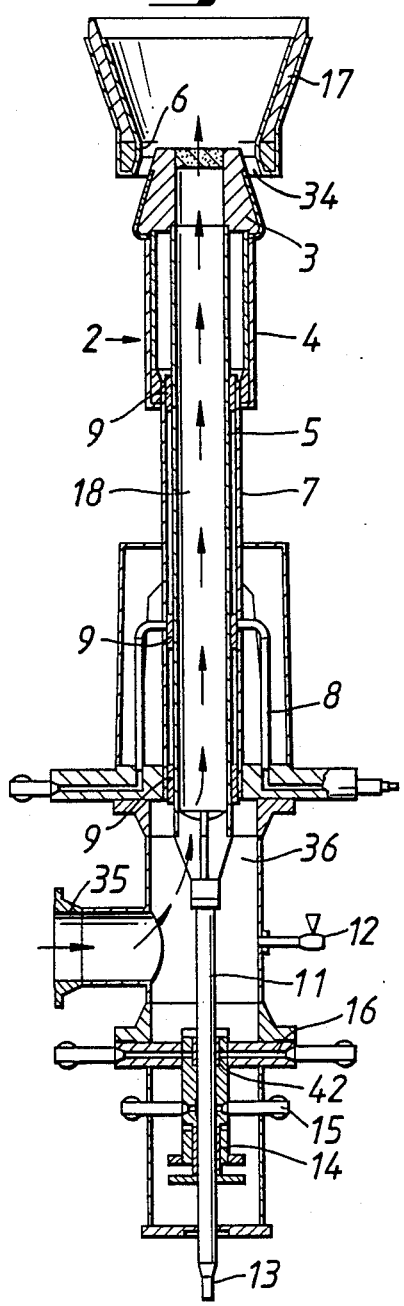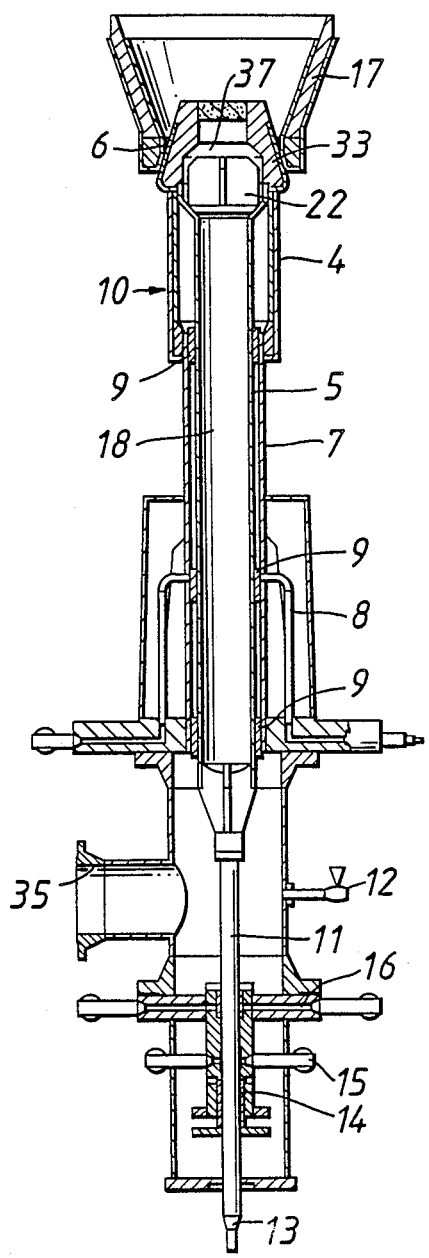

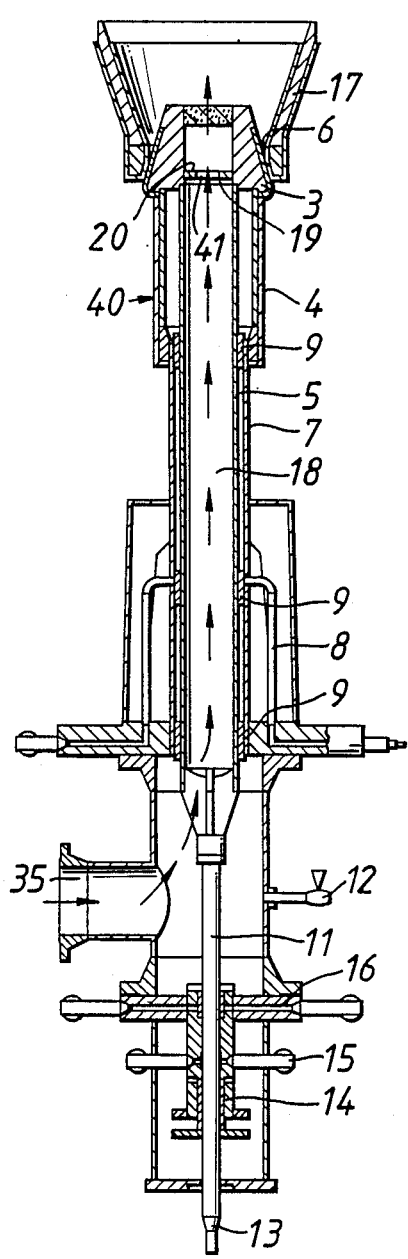
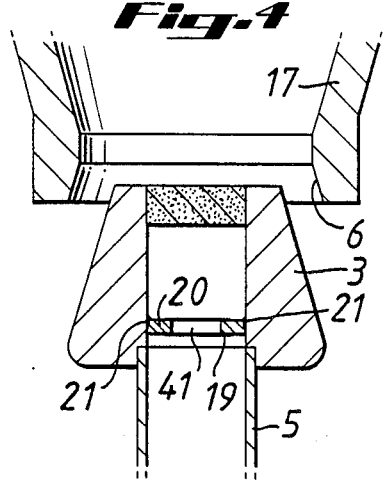
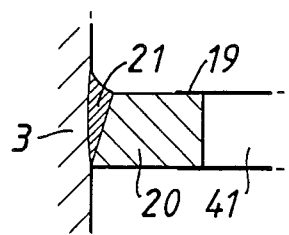
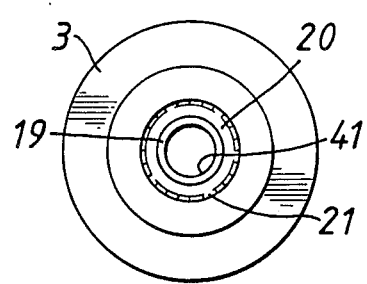

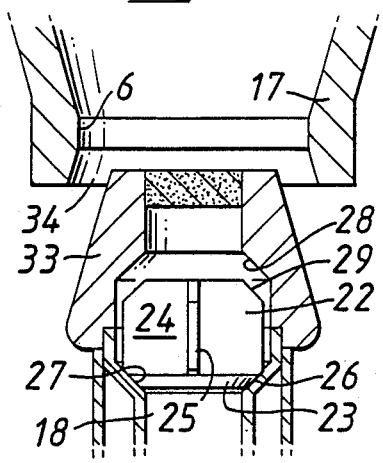
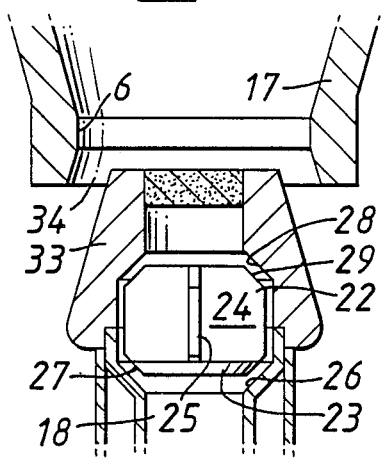
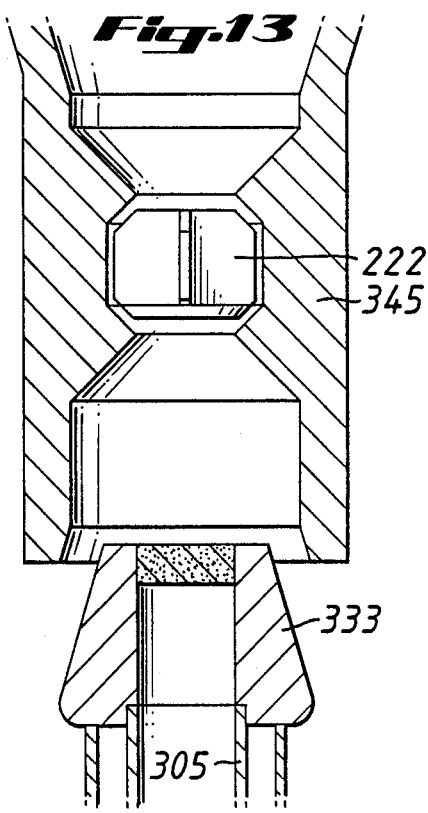
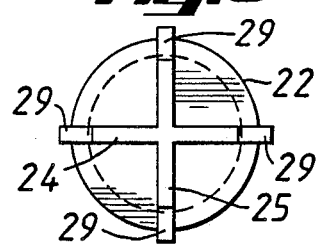
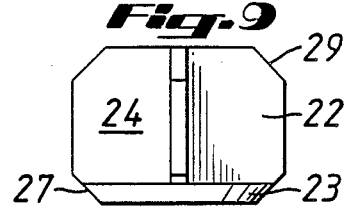

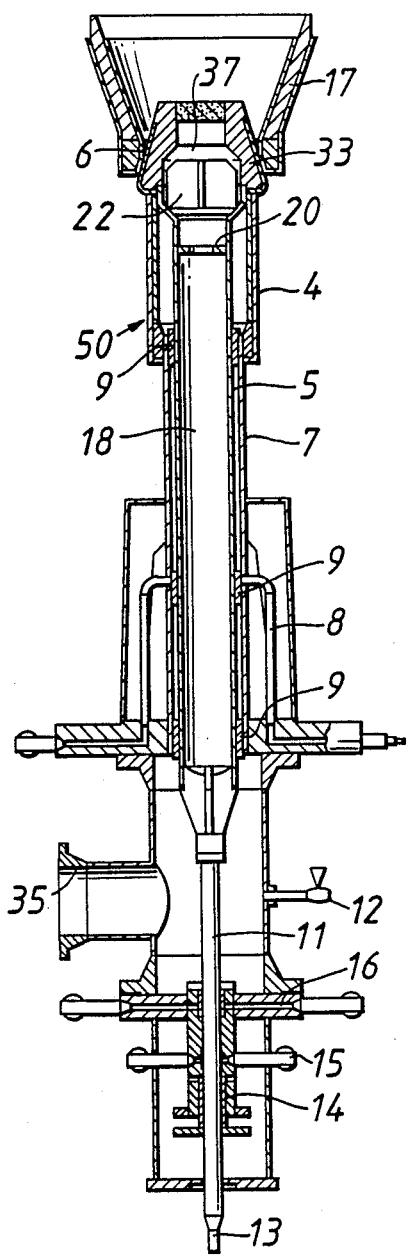
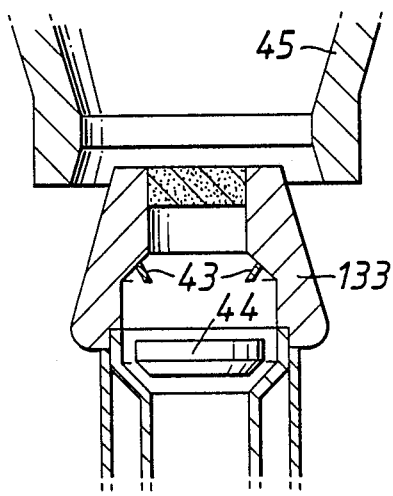
Fig. 11
Fig. 12

PLUG VALVE

BACKGROUND OF THE INVENTION

1. Field of the Invention

This invention relates to a control valve, and particularly to a plug type control valve for controlling the flow of fluids or fluidized materials through a conduit, such as the powered catalyst transfer lines and flue gas vent stacks employed in fluid catalytic cracking systems and in fluid catalytic hydroforming systems in the petroleum refining art; and to a conduits useful with plug valves.

2. Description of the Prior Art

Fluid catalytic methods are used widely in the petroleum and chemical industries. In these methods finely divided catalyst particles, are maintained suspended in a gas in the so-called "fluid state" under reaction conditions. Particles in the fluid state undergo hindered settling, i.e., they act in many ways like a liquid. Thus, they may be conveyed from one vessel to another through a conduit, they develop a pressure head, etc.

Fluid catalytic procedures have made it possible for large units to operate continuously on-stream for extended periods of time under closely controlled conditions. Catalysts in such units in processes where deposition of undesirable coke or other contaminant is encountered during the reaction state may be maintained at a predetermined level by continuously circulating the catalyst from the fluid reactor to a regenerator, where such coke or contaminant is removed, as by oxidative combustion. Fluid units of large capacity, such as a through-put of sixty thousand barrels or more of charge per day, are intended to operate on-stream for periods of as long as a year or more without being shut down.

The present invention is capable of various applications involving high temperature operations in the chemical processing and petroleum refining arts, including use in a converter, such as a fluid catalytic cracking unit or a fluid catalytic hydroforming unit of conventional design, having superimposed contact chambers in which the catalyst is maintained in a state of phase separation comprising an upper diffuse phase and a lower dense pseudo-liquid phase, the catalyst being withdrawn from the lower dense phase of the upper chamber through a vertical internal standpipe and discharged at a low point within the dense phase of the lower chamber and, after suitable treatment in the lower chamber, being returned upwardly through an internal vertical carrier line to the dense phase of the upper chamber.

A continuous cycle flow of catalyst between the chambers is obtained by passing catalyst by gravity flow from the upper chamber to the lower chamber through a standpipe and passing the catalyst from the lower chamber to the upper chamber through a carrier line by injection thereinto a stream of the gas to be contacted in the upper chamber, the continuous flow of the mixture upwardly through the carrier line resulting from the fact that the gas and catalyst form a mixture of lower particle concentration within the carrier line than is present in the dense bed of the catalyst in the lower chamber. In those cases where a regeneration zone is superimposed upon a conversion zone, the gas introduced into the carrier line is ordinarily air or other oxygen-containing gas. In those cases where the conversion zone is superimposed upon the regeneration zone the gas introduced into the carrier line is a stream of vaporous hydrocarbons.

Suitable flow control of catalyst from the standpipe into the dense phase of the lower chamber and from the latter into the carrier line for conveyance into the upper chamber is obtained by the use of plug valves engageable with the lower ends of the transfer lines and having elongated valve stems extending through the vessel wall controlled in their longitudinal movement by external mechanical or manual operating means. Such plug valves find applications in oil refineries in controlling the flow of catalyst into a reaction chamber which is subject to temperature extremes, for example, in the range of 1500° F., as well as in other industrial applications wherein the valves are subject to oppositely directed displacements due to thermal expansion and spring forces.

Plug valves (such as Kellogg Orthoflow Valve, U.S. Pat. No. 2,850,364) are used to control the flow of catalyst to introduce oil feed stock or lift air into a riser line. One problem occurring with the hollow tube plug valve providing lift air through the center hollow section is that the lift air pressure at the inlet of the valve cannot be maintained at a high enough level to overcome the bottom regenerator pressure. Another problem occurring with the hollow tube plug valve providing lift air is that when the lift air flow stops due to failure or stoppage of the air blower (which is an infrequent but regular occurrence) catalyst is dumped from the upper regenerator down through the riser in the hollow section of the plug valve.

There has been a long-felt need to over come the problems associated with the prior art plug valves.

In accordance with 37 C.F.R. §156, applicant is aware of the following U.S. patent references, copies of which are submitted herewith:

| U.S. Pat. No. | Inventor | Title |
|---|---|---|
| 758,118 | F. Sticker | Sand Blaster |
| 998,111 | J. D. Murray | Sand Blast Apparatus |
| 1,319,193 | K. H. V. Von Porat | Feeding Device For Pulverulent Fuel |
| 1,364,532 | K. H. V. Von Porat | Feeding Device For Pulverulent Fuel in Furnaces |
| 1,566,517 | L. H. Bergman | Blowing Tank For Pneumatic Transport Systems |
| 2,433,726 | C. H. Angell | Apparatus for Contacting Fluids with Subdivided Solids |
| 2,664,338 | P. W. Cornell | Line and Valve System for Fluidized Particle Handling |
| 2,668,755 | H. Kershaw et al | Plug-Type Control Valve For Fluidized Catalyst Conversion System |
| 2,850,364 | E. D. Dowling | Plug Type Catalyst Control Valve For Orthoflow System |
| 2,901,331 | H. J. Held et al | Apparatus For Fluid Catalytic Reactions |
| 3,315,700 | E. C. Greenwood | Tubular Jacketed Double Bellows Valve |
| 3,339,577 | J. W. Teegarden | Valve Construction |
| 3,846,080 | J. P. BacLean et al | Shielded Tip Access Tube A Reactor Probe |
| 4,518,146 | Stinson et al | Valve Operator Control System |
| 4,623,119 | van der Wiel | Plug Valve |

U.S. Pat. No. 758,118 (lines 58–68) discloses a sandblast device having a valve of size and formation corresponding to a flared end of a pipe. The pointed end of the valve has an outlet port in line with a passageway extending through a tubular operating rod which is connected to the valve.

U.S. Pat. No. 998,111 (lines 49-65) discloses a sandblast apparatus with a valve having a hollow stem and a conical head.

U.S. Pat. No. 1,319,193 (Page 1, Col. 2, lines 89-110; Page 2, Col. 1, lines 1-38) discloses a device for blowing powderized pulverulent fuel into a furnace. The device has a conical mouth through which the powder flows to a tube which leads to the furnace. The conical mouth is raisable to contact the tube to shut off the powder flow.

U.S. Pat. No. 1,364,532 discloses a variety of valves for use in feeding devices for pulverulent fuel in furnaces.

U.S. Pat. No. 1,566,517 (lines 89-120) discloses a valve with a siding nozzle which reciprocates within a bearing. A stream of air is delivered through the nozzle.

U.S. Pat. No. 2,433,726 discloses an apparatus for conversion of fluid hydrocarbons in contact with subdivided solid catalysts with valves for controlling the flow of solid catalysts (Col. 4, line 36). The valves have a cone or flow restricting member which can seat in the end of a conduit (Col. 6, lines 21-35).

U.S. Pat. No. 2,664,338 discloses a system for fluidized particle handling having a valve with disc-shaped valve members (Col. 6, lines 42-59).

U.S. Pat. Nos. 2,668,755 and 2,805,364 disclose plug valves with hollow injector heads.

U.S. Pat. No. 2,901,331 discloses an apparatus which has a cyclone separator for separating catalyst particles from product or effluent gases. The separator has a trickle valve with a plate for closing off the valve's discharge opening (Col. 3, lines 68-75; Col. 4, lines 1-41).

U.S. Pat. No. 3,315,700 discloses a tubular jacketed double bellows valve.

U.S. Pat. No. 3,339,577 discloses a valve with a stem and a valve plug which is movable to seat in a seat ring.

U.S. Pat. No. 3,846,080 discloses a shielded tip access tube for a reactor probe.

U.S. Pat. No. 4,518,146 discloses a valve operator control system for controlling a plug valve.

U.S. Pat. No. 4,623,119 discloses a valve having a plug connected to slips wherein opening and closing the valve involves both vertical and rotational motion of the plug.

Applicant believes U.S. Pat. Nos. 2,668,755; 2,850,364; and 4,518,146 are pertinent to the present invention.

SUMMARY OF THE INVENTION

The present invention is directed to a novel and efficient plug valve, to a unique check valve for a plug valve, and to a pressure regulator for a plug valve. The present invention recognizes and solves the problems of fluid dumping down a plug valve's hollow stem and of insufficient pressure of the fluid flowing out through the hollow stem. A plug valve according to the present invention functions to provide an opening of desired size at the open end of a conduit to permit a first fluid (e.g. a catalyst stream) to enter the conduit or it functions to close off the conduit opening. The plug valve has a plug closure member connected to a hollow stem. The plug closure member is movable (with the stem) to affect the size of the conduit's opening or the seat therein closing it off. A second fluid flows out through a channel which passes through the hollow stem and through the plug closure member. This second fluid is under pressure so that it will assist the flow of the first fluid into the open end of the conduit.

The plug valve may have a check valve disposed in the channel which permits flow of the second fluid out of the channel and which prevents flow of the first fluid into the channel when the pressure of the first fluid exceeds that of the second fluid or when the second fluid flow ceases. The plug valve may have a pressure regulator disposed at some point in the path of flow of the second fluid to maintain the pressure in the channel at a desired level. Although such a pressure regulator can be used to obtain any desired pressure of the second fluid for any purpose, it is particularly useful for insuring that the pressure in the channel is maintained sufficiently high to counteract any exterior pressure on the plug valve.

It is therefore an object of the present invention to provide a novel and efficient plug valve.

Another object of the present invention is the provision of a novel and efficient check valve for a plug valve.

Yet another object of the present invention is the provision of a novel and efficient pressure regulator for a plug valve.

A further object of the present invention is the provision of a plug valve having a check valve which prevents the dumping of fluid down through the hollow stem connected to a closure plug on the valve.

An additional object of the present invention is the provision of a plug valve in which the pressure in the hollow stem of the valve is maintained at a desired level. A particular object is the provision of a such a valve in which the pressure of fluid in the hollow stem is maintained higher than the pressure of other fluids exterior to the stem.

Another object of the present invention is the provision of conduits having a check valve or a pressure regulator.

To one of skill in this art who has the benefits of this invention's teachings, other and further objects and advantages will be clear from the following description of presently preferred embodiments, given for the purpose of disclosure when taken in conjunction with the accompanying drawings.

BRIEF DESCRIPTION OF THE DRAWINGS

FIG. 1 is a side view in cross-section of a prior art plug valve.

FIG. 2 is a side view in cross-section of a plug valve according to the present invention.

FIG. 3 is a side view in cross-section of a plug valve according to the present invention.

FIG. 4 is a side view in cross-section of a portion of the valve in FIG. 3 showing an orifice plate in the stem channel.

FIG. 5a is a side view in cross-section of a portion of the orifice plate shown in FIGS. 3 and 4.

FIG. 5b is a top view of the orifice plate of FIG. 4.

FIG. 6 is a side view in cross-section of a portion of the plug valve of FIG. 2.

FIG. 7 is a side view in cross-section of the portion of the plug valve of FIG. 2 shown in FIG. 6 showing the check valve disposed apart from the lower seat withing the plug and tube.

FIG. 8 is a top view of the check valve shown in FIGS. 2, 6, and 7.

FIG. 9 is a side view of the check valve of FIG. 8.

FIG. 10 is a bottom view of the check valve of FIG. 8.

FIG. 11 is a side view in cross-section of a plug valve according to the present invention.

FIG. 12 is a side view in cross-section of a portion of a plug valve according to the present invention.

FIG. 13 is a side view in cross-section of a plug valve and a conduit according to the present invention.

DESCRIPTION OF PREFERRED EMBODIMENTS

Referring now to FIG. 1, a prior art plug valve 2 has a guide tube 7 within which is movably disposed a hollow stem tube 5. A plug closure member 3 is secured to one end of the stem tube 5. A channel 18 extends through the stem tube 5 and the plug closure member 3. An actuator (not shown) is connected to an end 13 of the stem tube 5. The actuator can move the stem tube 5. The actuator can move the stem tube 5 up and down within the guide tube 7 so that the plug closure member 3 is movable to affect the size of an opening 34 (see FIGS. 6, 7) in a conduit 17 or so that the plug closure member 3 is seated on a seat 6 of the conduit 17 to prevent flow through the conduit 17.

Guide liner bearings 9 facilitate the movement of the stem tube 5 in the guide tube 7. A shroud 4 secured to the plug closure member 3 protects the stem tube 5 from wear due to catalyst flow.

A purge system 8 is provided which is in communication with the space between the guide tube 7 and the stem tube 5 for purging any unwanted fluid or material which moves into the space. A fluid (such as air) is flowed through the inlet 35 connected to the chamber 36 which is in communication with the channel 18. A fluid pumping source (not shown) pumps the fluid to the inlet 35 at a desired pressure. A pressure indicator 12 is connected to the chamber 36 for providing pressure reading for the fluid in the chamber 36. The end 13 of the stem tube 5 is connected to the shaft 11 which is in turn connected to the stem tube 5. The arrows in FIG. 1 show the path of air flow through the channel 18 and out of the plug closure member 3.

A lower stem purge system 16 provides purging for bearings 42 which encompass the shaft 11. A packing 14 is provided for the shaft 11 and a sealant injection device 15 provides the passage to inject a sealing medium for the purpose of renewing the packing while the plug valve is in service.

As shown in FIG. 1, the plug closure member 3 is not seated in the seat 6 of the conduit 17. Fluid flow, such as a flow of catalyst particles, is permitted through the opening 34 of the conduit 17. The force of the air coming up through the channel 18 impels the catalyst particles into the conduit 17. When it is desired to cut off the flow of fluid through the opening 34, the activator (not shown) is activated to move the shaft 11, stem tube 5, and plug closure member 3 upwardly so that the plug closure member 3 seats against the seat 6 of the conduit 17. (Such seating is illustrated in FIG. 2).

Referring now to FIG. 2 the plug valve 10 according to the present invention has various parts similar to those of prior art valves. Numerals common to FIGS. 1 and 2 indicate similar parts. A chamber 37 is fashioned within a plug closure member 33 and the stem tube 5 in which is disposed a check valve 22. The check valve 22 does not shut off the flow of air up through the channel 18 to the conduit 17; but it will prevent the flow of fluid such as fluid with catalyst particles down into the channel 18. In the event that pressure is reduced or lost in the channel 18, the pressure of the fluid with the catalyst particles may be sufficiently high to pump such fluid down through the plug closure member 33 and into the channel 18. To prevent this, the check valve 22 is disposed so that a seat 27 of the check valve 22 will move to seat against a seat 26 formed at the top of the stem tube 5 (see FIG. 6). A bottom plate 23 of the check valve 22 is solid and prevents flow down into the channel 18. Upon the re-activation of the air flow up through the channel 19, the check valve is pushed upwardly and air again flows through the plug closure member 33 (see FIG. 7). A top edge 29 on the check valve 22 stops against a top stop 28 on the plug closure member 33; but due to the configuration and construction of the check valve 22, and the disposition of the plates 23, 24, and 25 this is not a sealing engagement and the flow of air continues when the edge 29 stops against the stop 28.

Ask shown in FIGS. 8-10, the check valve 22 has an upwardly extending top member structure which in the embodiment of FIGS. 8-10 has two opposed upwardly extending plates 24 and 25 which are secured to the solid bottom plate 23, of course the check valve can be disposed anywhere in the fluid channel and can be disposed either completely in the plug closure member or completely in the stem tube. When seat 27 is not seated against seat 26, fluid flows upwardly past and around the plates 23, 24, and 25. Of course the upwardly extending member means may have different configurations than that shown in the embodiment of FIG. 6. For example the plates may be perforated or cut-out in any desired shape and number of cut-outs. A single plate may be used or more than two may be used. Instead of upright plates, rods or bars (one or more) which stop against seat 28 may be used. Alternatively, as shown in FIG. 12 stop members 43 secured to and extending from the plug closure member 133 can be used to stop the motion of the plate 44 toward the conduit 45 so that even when the plate 44 is stopped against the stops 43 flow continues into the conduit 45. The stops 43 do not extend circumferentially completely around the interior of the plug closure member 1k33; if they did flow would be stopped when the plate 44 contacts the stop members.

Referring now to the embodiments of the present invention shown in FIG. 3, a plug valve 40 according to the present invention has parts similar to the valve 2 of FIG. 1. Numerals common to FIGS. 1 and 3 indicate similar parts. A pressure regulator is provided in the channel 18 of the valve 40 in the form of a plate 20 with an orifice 41 therethrough. As indicated by the arrows, air can flow through the orifice 41. The size of the orifice 41 is chosen to effect a desired pressure within the channel 18. In one embodiment the orifice is sized so that the pressure within the channel 18 is equal to or slightly greater than the pressure of fluid exterior to the guide tube 7 so that such fluid (e.g. fluid with entrained catalyst particles) is not forced around the bearings 9 and into the space between the guide tube 7 and the stem tube 5. As shown in FIG. 5, the plate 20 has a hardfacing weld overlay 19 which is welded with a full penetration weld 21 to the stem tube 5. FIG. 5b illustrates a top view of the plate 20 with its orifice 41 within the plug closure member 3. Of course the pressure regulator can be disposed entirely in the plug closure member or entirely in the stem tube.

Referring now to FIG. 11, a valve 50 has both a check valve 22 (as previously described) and a pressure regulating plate 20 (as previously described). In the embodiment of FIG. 12 the pressure regulating plate 20 is mounted within the stem tube 5.

As shown in FIG. 13 a conduit 345 (similar to conduits 17 and 45 in structure and function) can be provided with a check valve 222 (substantially similar in structure and function to the check valve 22 of FIG. 2). The plug closure member 333 and the stem tube 305 are similar in structure and function to the plug closure member 3 and the stem tube 5 of FIG. 1.

To those of skill in this art who have the benefit of this invention's teachings it will be clear that certain changes and modifications can be made in the disclosed preferred embodiments without departing from the spirit of the invention as defined in the following claims.

What is claimed is:

1. A plug valve for controlling fluid flow of a first fluid containing catalyst particles and flowing under pressure from a first chamber into an open end of a conduit, and for effecting closure between the chamber and the open conduit end, the plug valve comprising a plug closure member seatable in the open end of the conduit to restrict or close off the open end of the conduit to flow of the first fluid and movable toward and away from the open end of the conduit, a hollow stem connected to the plug closure member, channel means extending through the plug closure member and through the hollow stem for the passage of a second fluid flowing under pressure therethrough, and a check valve comprising a body member held within yet freely movable within a second chamber having a top and a bottom and open at both its top and bottom, the chamber in the channel means, the second chamber having a top stop shoulder for preventing further upward movement of the body member and the body member has a bottom plate and upwardly extending plates which also extend outwardly beyond the bottom plate so that when the top stop shoulder stops the body member the second fluid can still flow around the plate and into the conduit, the body member movable to seat against and close off the open bottom of the second chamber in response to the first fluid flowing through the plug closure member rather than into the conduit to prevent the first fluid from flowing into and through the stem, and the second fluid permitted to flow past the body member when the body member is not seated against the bottom of the second chamber and the first fluid cannot flow into the plug flow channel so long as the pressure of the second fluid is greater than the pressure of the first fluid.

2. A plug valve for controlling fluid flow of a first fluid from a first chamber into an open end of a conduit, and for effecting closure between the chamber and the open conduit end, the plug valve comprising a plug closure member seatable in the open end of the conduit to restrict or close off the open end of the conduit to flow of the first fluid therethrough and movable toward and away from the open end of the conduit, a hollow stem connected to the plug closure member, channel means extending through the plug closure member and through the hollow stem for the passage of a second fluid therethrough, and a check valve for providing valving action on and in response to the first fluid, the check valve comprising a body member held within yet freely movable within a second chamber having an open top and an open bottom, the second chamber in the channel means, the body member movable to seat against and close off the open bottom of the second chamber in response to pressure of the first fluid flowing through the plug closure member rather than into the conduit, the body member seatable against the open bottom to inhibit or to prevent the first fluid from flowing into and through the stem, and the second fluid permitted to flow past the body member when the body member is not seated against the bottom of the second chamber.

3. The plug valve of claim 2 wherein the first fluid is a fluid containing catalyst particles.

4. The plug valve of claim 2 wherein the first fluid flows under pressure and the second fluid flows under pressure and the first fluid cannot flow into the channel means so long as the pressure of the second fluid is greater than the pressure of the first fluid.

5. The plug valve of claim 2 wherein the second chamber has a top stop shoulder for preventing further upward movement of the body member and the body member has a bottom plate and upwardly extending plates which also extend outwardly beyond the bottom plate so that when the top stop shoulder stops the body member the second fluid can still flow around the plate and into the conduit.

* * * * *